F. E. IVES.
PHOTOGRAPHIC CAMERA.
APPLICATION FILED SEPT. 23, 1912.

1,153,229.

Patented Sept. 14, 1915.
3 SHEETS—SHEET 1.

Fig. 1.

F. E. IVES.
PHOTOGRAPHIC CAMERA.
APPLICATION FILED SEPT. 23, 1912.

1,153,229.

Patented Sept. 14, 1915.
3 SHEETS—SHEET 2.

F. E. IVES.
PHOTOGRAPHIC CAMERA.
APPLICATION FILED SEPT. 23, 1912.

1,153,229.

Patented Sept. 14, 1915.
3 SHEETS—SHEET 3.

UNITED STATES PATENT OFFICE.

FREDERIC E. IVES, OF WOODCLIFFE-ON-HUDSON, NEW JERSEY.

PHOTOGRAPHIC CAMERA.

1,153,229.   Specification of Letters Patent.   Patented Sept. 14, 1915.

Application filed September 23, 1912. Serial No. 721,908.

*To all whom it may concern:*

Be it known that I, FREDERIC E. IVES, a citizen of the United States, residing at Woodcliffe-on-Hudson, in the county of Bergen and State of New Jersey, have invented certain new and useful Improvements in Photographic Cameras, of which the following is a specification, reference being had therein to the accompanying drawing.

My invention relates to photographic cameras.

The novel features herein are shown worked out in a camera designed for color-photography, and more particularly to that type of color-photography camera which may be termed a multiple camera, in which a plurality of sensitive plates are simultaneously exposed by means of a single lens or aperture. Such novel features, however, are found to a large extent to be useful in photographic cameras generally, and the present invention, therefore, is not to be restricted to color-photography excepting to the extent hereinafter specifically stated.

Among the objects of the present invention is the general improvement in construction, operation and effectiveness of the class of cameras referred to.

Specifically it is an object hereof to improve the manner of separation of the light rays from the lens or aperture into a plurality of separate images for the respective sensitive plates.

Other objects will be hereinafter pointed out or will be obvious to those skilled in the art.

The present invention consists in the novel apparatus, structure, combinations, arrangements, parts and modes of operation hereinafter illustrated and described.

I believe that I am the first to provide in or for a camera a partial reflector adapted to be interposed in the path of light (consisting, of a transparent colored plate), and having area portions that are both non-transmitting and reflecting (mirrored), and other area portions that are not so, but which are, for example, non-reflecting or transparent.

It is an object hereof to afford a practical and useful embodiment of such improvement, and specifically this part of my invention is shown as an inclined sheet of glass silvered in stripes. This part of my invention is of great importance because with the use of plain glass reflectors the reflecting power is small and a disproportionately large amount of light is transmitted to the sensitive film or films at its rear. The partial silvering of the reflector secures a more equal division and therefore enables much shorter exposures with, for example, panchromatic plates that are approximately equally sensitive to red and green light. At the same time the expedient referred to while efficient does not add materially to the cost of a camera and adds nothing to its weight.

I believe that I am also the first to provide in a camera a party-silvered or patterned transparent reflector interposed and movable in the light path during exposure.

It is an object hereof to afford a practical and useful embodiment of such improvement, and specifically this part of my invention is shown as an external mechanical means for causing an inclined transparent reflector to move during exposure across the light path and substantially in its own plane.

An internal transparent reflector which is mirrored in stripes or other patterns of sufficiently small dimension, will not cause shadows or destroy the uniformity of the images unless possibly by defraction at the edges of the mirrored portions, and such defraction is practically preventable by rendering the dimensions not too minute but substantially as hereinafter described. Any possible effects, however, of these kinds and any linear appearance in out-of-focus details are removed by giving the partially silvered reflector a progressive movement in its own plane during exposure in accordance with this feature of my invention.

I believe I am also the first to provide in a camera successive transparent reflectors, the same being inclined to the light path at such different inclines as to throw the reflected images toward different sides of the camera, enabling three or more sensitive films to be held in relation hereto. With such a reflector arrangement three sensitive films can be employed, positioned one at the rear and the other two at different sides of the camera opposite the respective reflectors. The two reflectors may for example both be inclined substantially 45° to the light path, one being set vertically and the other being inclined substantially 45° from the vertical; so that the first one throws its reflected image horizontally, while the latter throws its reflected image vertically. Of course, however, the terms vertical and horizontal used throughout this specification are only relative, since the camera might be in use bodily slanted to any desired angle. The utility of this part of my invention may be described as follows. An extended image projected by the camera objective through a plane parallel transparent reflector standing at 45° to the axis of the camera or the light path, must suffer some distortion of shape. This distortion increases with increase in the reflector's thickness, and it might prevent the negatives made respectively by reflection and transmission from registering perfectly with each other. Two such reflectors similarly inclined will magnify the distortion. By the present feature of my invention, however, such objection is overcome and the first and second images are formed in planes at right angles to each other at the side and top of the camera respectively, and at right angles with the unreflected image at the back. A slight distortion of the transmitted image is produced by the first inclined reflector, but the second inclined reflector relatively disposed as stated, causes a slight distortion at right angles to the first distortion so that the resulting rear image then corresponds exactly in form and shape with the first reflected image. With this arrangement of course the second reflected image is slightly distorted, but to only half the extent as though transmitted through two similarly inclined reflectors; and such second reflected image could be corrected if required by other means, although as will be seen, I prefer that this image shall be for the blue-sensation or yellow-printing negative, and therefore the distortion becomes of secondary importance, the eye being far less sensitive to the registration of the yellow component of a color photograph.

It is a further object hereof to combine the several features above referred to coöperatively for the production of a photographic camera superior in the respects mentioned, simple and inexpensive.

I will first describe an embodiment of the present invention and will then point out the novel features in the claims.

In the accompanying drawings forming a part hereof.

Similar characters of reference designate corresponding parts in the several figures of the drawings.

Referring first to the general parts of my camera, the box or casing 1 extends longitudinally, or forwardly and backwardly, and affords a light path whereby rays of light passing through the lens 2 may travel directly through the casing 1 to a sensitive film at the extreme rear. Of course the sensitive film may be employed in any desired form, such for example as the film on the surface of the ordinary so-called dry plate, and for holding the films plate holders, 3 at the rear, 4 at the side and 5 at the top, may be employed. The camera will be provided with positioning means for the sensitive films preferably in the form of grooves or grooved strips 6, 7 and 8 respectively for the plate holders 3, 4 and 5.

It will be noticed that the three plate holders are so positioned as to hold the sensitive film in three different planes respectively, each at right angles with the other two. It will also be noticed that in order to secure proper focal distance for the plate holder 5, the camera casing is there provided with an upward extension 9.

Thus far I have described all of the parts visible from the exterior with the exception of the external device at the right side of the box whereby the movement of one of the optical screens during exposure is effected.

Figures 4, 5:
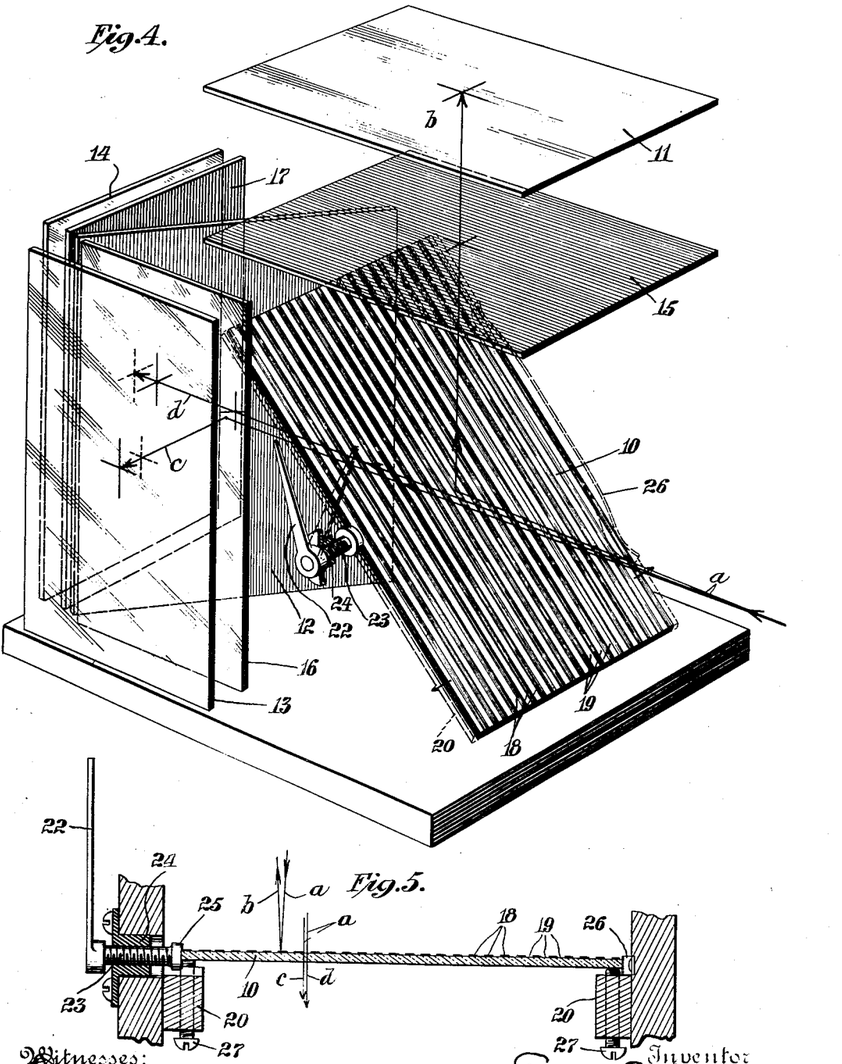
Fig. 4 is what may be considered as an interior perspective, the camera box or casing itself removed, but all of the screens and plates indicated, the camera lens being supposed to stand at the right as indicated by the direction of the light rays.
Fig. 5 is a detail cross-section showing one form of device for causing a movement of one of the optical screens during exposure.

The interrelation of the various optical screens and plates is best seen in Fig. 4. The inclined transparent reflectors may be broadly referred to as optical screens, since for some purposes their specific characteristics might be departed from while yet employing some of the features of the present invention. The light rays coming from the exposing point $a$ or the lens, first meet one of the two inclined screens or reflectors, namely the front screen 10. The structure and position of this will be described more in detail. Reflected rays of light from screen 10 pass laterally from the light path, namely upwardly as indicated by the rays $b$ to form a horizontal image upon the sensitive film or plate 11. Rays of light passing through screen 10 next encounter the second or rear inclined screen 12, whose position will be hereinafter more specifically defined. Rays reflected from screen 12 are thrown laterally, namely to the right-hand side of the camera, as indicated by ray $c$ so as to form a vertical image upon the sensitive plate 13. Rays of light passing through the transparent screen 12 throw a vertical image directly upon the rear sensitive plate 14 as indicated by the ray $d$. Thus three images are formed upon three sensitive plates all at right angles to each other.

In addition to the screens and plates 10, 11, 12, 13, 14 referred to, are shown three further screens 15, 16 and 17. The screen 15 is shown as a horizontal piece of glass through which the light rays $b$ pass on the way to plate 11. Screen 16 is shown as a vertical plate of glass through which the rays $c$ pass on the way to the sensitive plate 13. Screen 17 is shown as a vertical plate of glass through which the rays $d$ of light forming an image upon the rear sensitive plate 14, must pass.

It should be here stated that since the present camera is designed more particularly for taking three-color selection negatives for color photograph, there will be suitable provision made for effecting selection of the proper colored light rays for the respective plates. Having the described arrangements of screens and plates, the result could be effected in many ways. In the first place each plate holder or the sensitive plates themselves might have incorporated a colored layer. Or the three screens 15, 16 and 17 or any one or more of them might consist of suitably colored glass according to the chosen arrangement. Or on the other hand the result might be effected by constituting the inclined screens 10 and 12 of colored glass. Specifically the following arrangement might be employed to advantage. Let the plate 11 be red-sensitive, the plate 13 blue-sensitive and the plate 14 green-sensitive. Let the screen 15 be of ruby glass, the screen 17 of green glass and the screen 16 either of blue glass or clear. This arrangement will effect the desired color selection. Additionally the inclined screen 10 might be constituted of blue-green glass, thus effectively admitting the passage of blue and green rays, but precluding a double reflection of red rays to plate 11. Likewise inclined screen 12 could be of yellow glass, thus admitting free passage of green rays to plate 14, while precluding the double reflection of blue rays to plate 13.

Assuming now some proper provision for color selection, I will proceed to describe the details of the screens, their constitution, operation and relative arrangement. The screen 10 is partly silvered or mirrored; in other words, it has area portions which are both reflecting and non-transmitting, and other area portions which are not so, but which are transmitting. Thus the portions 18, 18 are totally reflecting or mirrored as by application of metallic silver, preferably as shown to the front or first surface of the screen. The intermediate area portions 19, 19 are transmitting and instead of consisting merely of openings in the screen, preferably comprise merely transparent portions of the screen which for that purpose may be made of transparent glass colored or uncolored. The mirrored area portions and the transparent portions are preferably arranged in a substantially regular pattern of, or division into, various figures such as recurring designs, but preferably stripes as shown. For instance, the stripes may be merely straight, parallel and longitudinal as shown, and of equal or unequal width depending upon the percentage of light desired to be totally reflected upwardly from the screen 10 to the sensitive plate 11. In regard to dimensions and assuming a camera of approximately twelve-inch focus, I would choose by preference for the screen 10 a plane parallel colored glass having polished silver lines upon its first surface with about ten lines to the inch, the silvered stripes and the intervening clear spaces being approximately equal in width and area. If the number of lines to the inch materially exceeds this, the definition will be injured by the bending of some of the light rays out of their true course by diffraction at the edges of the silvered lines. On the contrary if too wide a spacing is employed relatively to the aperture of the camera's objective, the light will be unevenly distributed, and some parts of the picture may show a linear structure introduced by diffraction interference. The operation of this part of my improvement will be as follows: The light rays passing through the lens tend to throw a photographic image toward the rear of the camera. The rays forming this image will focus at a given distance from the lens. The partly silvered screen 10 is between the focused plane and the lens. Part of the rays will pass through the unsilvered portions of the screen 10 and will form the required image or images to the rear of the screen 10, for example on the sensitive films 13 and 14. Wherever the light rays, however, strike the silvered portions or stripes of the screen 10, they will be totally reflected upwardly, thus forming an image on the sensitive film 11. This image moreover will be a strong one and practically equal in strength and brilliancy to the image on the rear film 14. Thus a comparatively brief time of exposure will suffice, which would not be the case with an unsilvered transparent plate of glass in place of the screen 10. With my novel arrangement, moreover, the time of exposure of all three films may be made substantially equal, and neither one will be required to be overexposed in order that another may be sufficiently exposed.

Figure 3:
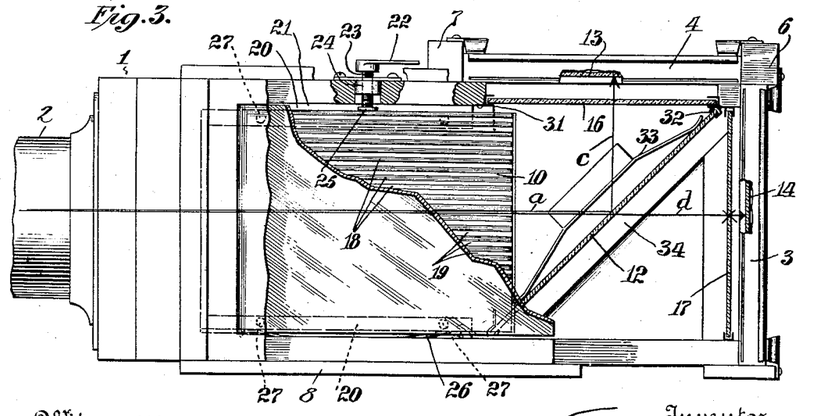
Fig. 3 is a plan view of the same camera partly in section near the rear end and broken away near the middle at different points.

I will now refer to that part of my invention which provides for the movement of an optical screen in the light path during exposure. As has already been stated, an objection to the partly silvered screen lies in the possibility of non-uniformity of light distribution and formation of linear structure or shadows, especially in connection with details which are not in proper focus but tend to focus nearer to the screen 10 than to the sensitive film. Such objections are overcome by this part of my invention in which the optical screen or mirrored reflector 10 is moved during exposure substantially in its own plane. Various kinds of movement could be employed for this purpose such as a straight shifting from one point to another, or a reciprocation between two points. Taking the case of a reflector mirrored in parallel stripes the movement will preferably be a linear movement transverse to the stripes and of an extent at least equal to the pattern unit, that is to say the width of a stripe. It is preferable that the transverse movement of the screen 10 in its own plane shall be twice the width of the stripe during exposure. In either case every portion of the light path has a silvered area interposed at one time and a transparent area at another time. When the movement is at least twice the width of a stripe, there is a more thorough equalization. In order to permit the movement of screen 10, it may be supported as shown, for example by gravity upon a pair of opposite shelves 20, 20, designed to present a width slightly greater than the width of the screen, so as to allow for the necessary lateral movement of the latter. Thus in Fig. 3 a space 21 is seen between the screen 10 and the side wall of the camera. For causing the actual movement of the screen I prefer an external device which may be hand-operated; and this may be in a form as shown adapted to push one edge of the screen laterally and to recede so that if the pushing movement be opposed by a resilient spring the transverse movement of the plate back and forth in its own plane is effected. A suitable external device may comprise the handle or pointer 22 secured to the outer end of a threaded shaft 23, fitted into a threaded portion 24 in the camera side wall and having an interior end 25 adapted to directly contact the silvered reflector 10. At the opposite side of the screen or reflector is shown a plate spring 26 of curved form bearing directly against the screen's edge, tending to push the screen bodily toward the shifting device at the other side. The operation of this part of my invention may be as follows: It will be understood that in making the exposures for color-selection negatives, the time of exposure is not brief, but occupies seconds or even minutes. The lens having been adjusted to proper focus and the sensitive films and holders inserted, the lens may be uncapped for the exposure, and the operator will then manually move the handle or pointer 22 through such arc as is necessary to cause the striped screen's complete movement. It may for example take two complete turns of the handle 22. The two turns could be made gradually so as to occupy the whole time of exposure, or could be made rapidly, followed by a reversal to original position and so on, thus effecting a reciprocation of the striped screen in its own plane.

I will now refer to that part of my invention involving the use of a plurality of interior transparent plane reflectors located in the light path and relatively inclined differently. The two reflectors referred to are reflector 10 and reflector 12, and while they may be variously constituted, whether of colored glass or otherwise, and whether partly silvered or otherwise, I prefer them to be as already hereinabove stated. The reflector 10 is so positioned as to reflect an image toward the top side of the camera, and the reflector 12 is so positioned as to throw an image toward a different but adjacent side, namely the right-hand side of the camera. By adjacent sides I mean two sides such as top side and right-hand side, which are at angles with each other and meet along a corner. The relative inclines may be thus described. Or the inclines may be described as follows. One of the reflectors 10 is substantially inclined, namely at 45° to the light path, and is also inclined to the same extent from the vertical. The second reflector 12, however, is not inclined to the vertical but stands vertically. This second reflector is like the first substantially inclined, namely at 45° to the light path. The result is not only to throw the reflected images toward different adjacent sides of the camera, but is also to offset and obviate a tendency to serious distortion of the transmitted images. The operation of the camera in this respect is substantially as follows: The first reflected image is thrown from screen 10 to sensitive film 11 and is undistorted. The transmitted rays, however, passing through the inclined reflector are distorted or shortened in one dimension to a slight degree depending on the thickness of the screen. The second reflected image is thrown from the reflector 12 to the sensitive film 13 and retains the slight distortion in the one dimension already referred to; but the effect of this can be minimized or suitably obviated as previously mentioned. The transmitted light rays passing through screen 12 are slightly distorted in their passage. If this screen was inclined in the same direction with, instead of differently from, the screen 10, the total distortion of the rays would be the sum of the distortions in the two screens respectively. Owing to the described and illustrated arrangement herein, however, instead of an increased distortion there is a correction due to the fact that in transmission through the first screen the distortion is in one direction, while in the second screen it is at right angles, thus restoring the proper proportions of the picture and causing an image upon sensitive film 14 which corresponds precisely with reflected image on sensitive film 11.

Figure 1:
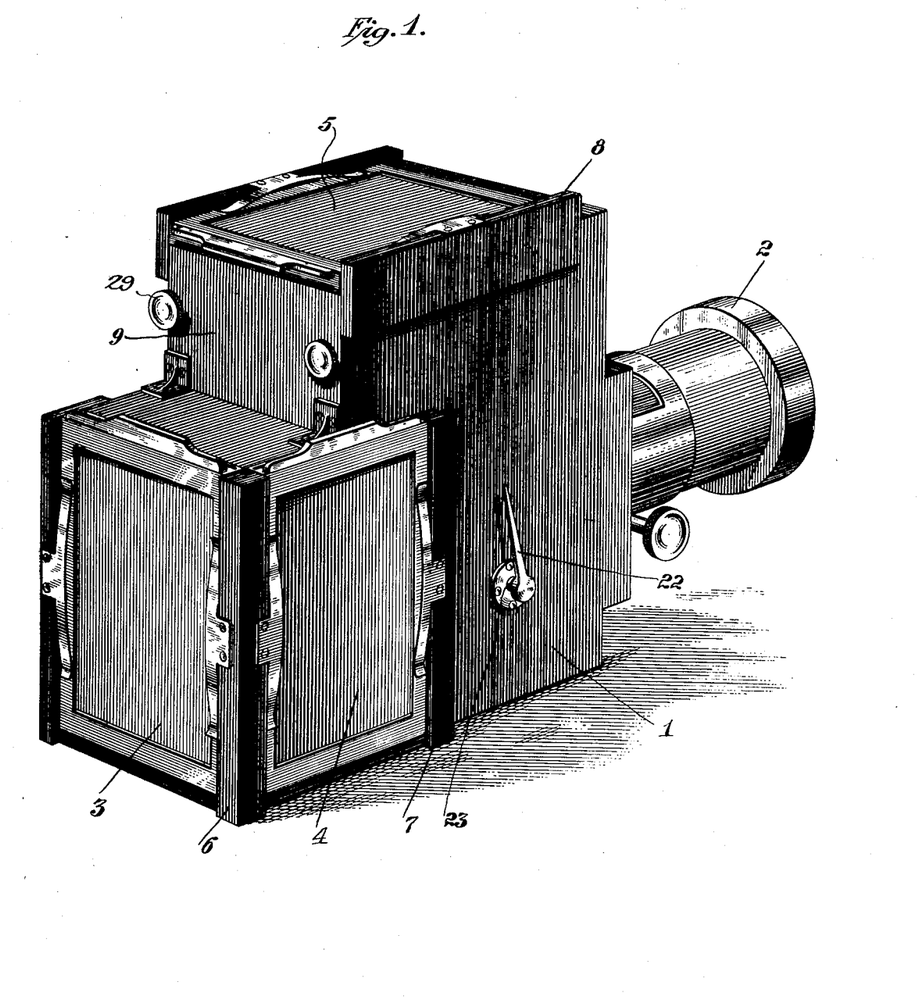
Figure 1 is a perspective view of the exterior of a camera embodying my invention.
Figure 2:
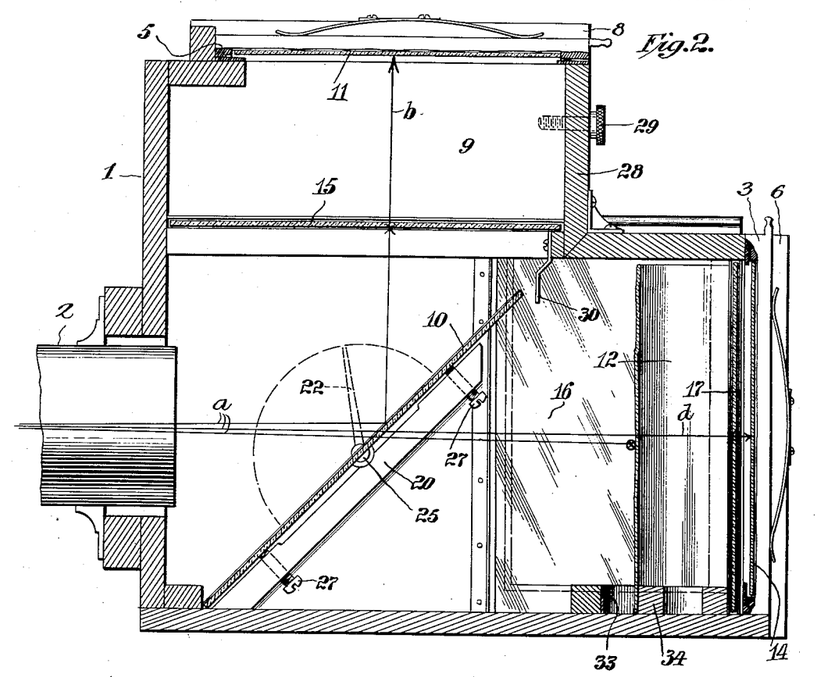
Fig. 2 is a longitudinal central cross-section of the camera shown in Fig. 1 with the exposing means or lens at the left.

All of the features of invention hereinabove described mutually harmonize with each other and produce a camera having high efficiency, accuracy and simplicity for trichromatic photography. Other minor features are involved, and these will now be referred to. The support of the inclined reflector 10 may be by means of the shelf 20, and in addition two adjusting screws 27, Figs. 2 and 5, may be employed to facilitate accurate adjustment of the reflector. In the upper rear portion of the camera is an L-shaped piece 28 of the casing. This may be made detachable independently of the other parts, and when in place secured by the screws 29. Light strips or shields may be employed in proper places, for example the horizontal shield 30, Fig. 2, protecting the rear and top sensitive plates from light rays reflected from one to the other. Likewise vertical shield 31, Fig. 3, may protect the side sensitive plate 13 from rays of light coming from the forward part of the camera. The inclined vertical reflector 12 may be suitably supported, as for instance by vertical grooves or guides 32 assisted by a plate spring device 33 at the floor of the camera pressing the reflector toward the fixed bar or abutment 34.

The construction of the several plate holders 3, 4, 5 need not be described, since they will be understood from the drawings, and indeed their particular form is not of the essence of the present invention, since any means of holding a sensitive film, whether flexible or rigid, might be employed.

The operation of the above described camera will be sufficiently understood from the matters already set forth.

By means of the invention thus set forth, the advantages hereinbefore referred to are attained and other advantages will be obvious to those skilled in the art. Since the present improvements and the several features thereof may be variously modified in detail without departing from the principles of the respective features of improvement, I do not wish to be limited to details excepting as set forth in the hereinbelow appended claims.

What I claim and desire to secure by Letters Patent is:

1. In or for a camera, a light separating optical screen adapted to be interposed in the light path and consisting of a transparent colored member having totally reflecting portions and transmitting portions.

2. In or for a camera, a light separating optical screen adapted to be interposed in the light path and consisting of a transparent colored member having totally reflecting portions and transmitting portions arranged alternately in patterns.

3. In or for a camera for making a set of color-selection negatives, a light separating reflector consisting of a colored glass plate having a parti-silvered first reflecting surface.

4. A camera for making a set of color-selection negatives including in combination a reflector inclined to the light path and consisting of a colored glass plate having a parti-silvered first reflecting surface and means for holding sensitive films behind and aside of said reflector.

5. A camera for making a set of three color-selection negatives including in combination a parti-silvered transparent reflector inclined to the light path, a second transparent reflector inclined to the light path behind said parti-silvered reflector, and means for holding three sensitive films in relation to said reflectors.

6. A camera for making a set of three color-selection negatives including in combination a parti-silvered transparent and colored reflector inclined to the light path, a second transparent reflector inclined to the light path behind said parti-silvered reflector, and means for holding three sensitive films in relation to said reflectors.

7. A camera for making a set of three color-selection negatives including in combination a parti-silvered transparent and colored reflector inclined to the light path, a second transparent reflector inclined to the light path behind said parti-silvered reflector said second reflector being of a color different from the first, and means for holding three sensitive films in relation to said reflectors.

8. In or for a camera, a partial reflector adapted to be interposed in the light path and consisting of a plate of colored glass having area portions that are totally reflecting and others that are transmitting, the same arranged in a substantially regular pattern, in combination with means for holding said reflector slantingly, a second slanting partial reflector located behind said first reflector and composed of a plate of differently colored glass, and means for holding three sensitive films respectively behind said second reflector and aside of both said reflectors.

9. A camera for making a plurality of negatives including in combination a patterned reflector and means for moving it in the light path during exposure in a manner to shift the pattern.

10. A camera for making a plurality of negatives including in combination a patterned reflector spaced from the focal plane, and means for moving it in the light path during exposure in a manner to shift the pattern.

11. A camera for making a plurality of negatives including in combination a parti-silvered transparent reflector arranged across the light path, and means for moving it during exposure substantially in its own plane in a manner to shift the pattern.

12. A camera for making a plurality of color-selection negatives including in combination, a parti-silvered transparent reflector set at an incline in the light path, means for holding a plurality of sensitive films in different relations to said reflector, and means for moving said reflector during exposure substantially in its own plane in a manner to shift the pattern.

13. A camera for making a plurality of color-selection negatives including in combination, a parti-silvered transparent reflector set at an incline in the light path, and having its silvered areas arranged in recurring patterns, means for holding a plurality of sensitive films in different relations to said reflector, and means for moving said reflector during exposure substantially in its own plane, and transversely to the pattern arrangement.

14. A camera for making a plurality of color-selection negatives including in combination, a parti-silvered transparent reflector set at an incline in the light path, and having its silvered areas arranged in recurring patterns, means for holding a plurality of sensitive films in different relations to said reflector, and means for moving said reflector during exposure substantially in its own plane, and transversely to the pattern arrangement a distance at least the width of the pattern unit or stripe.

15. In a camera the combination of an optical screen interposed in the light path during exposure and means operative during exposure to move said screen across the light path and substantially in its own plane, said screen comprising totally reflecting portions of substantially less area than the light path, and the screen movement serving to bring totally reflecting areas into every portion of the light path.

16. A camera for making a plurality of color-selection negatives including in combination, a colored transparent reflector located inclinedly across the light path and parts of whose area are totally reflecting, means for holding a plurality of sensitive films in different relations to said reflector, and means for moving said reflector during exposure across the light path in a manner to shift the pattern.

17. A camera for making a plurality of color-selection negatives including in combination, a colored transparent reflector located inclinedly across the light path and silvered in recurring pattern or stripe, means for holding a plurality of sensitive films in different relations to said reflector, and means for moving said reflector during exposure across the light path transversely to the pattern or stripe.

18. A camera for making three color-selection negatives including in combination, a colored transparent reflector located inclinedly across the light path and silvered in recurring pattern or stripe, a second colored transparent reflector located inclinedly across the light path behind the first reflector and of a different color therefrom, means for holding three sensitive films in different relations to said reflectors, and means for moving said first reflector during exposure across the light path in a manner to shift the pattern.

19. In a camera the combination of a transparent reflector inclined to throw a reflected image upwardly, a second transparent reflector inclined to throw a reflected image horizontally laterally, and means to position three sensitive films in three different planes to receive the direct and such reflected images.

20. In a camera the combination of two transparent plane reflectors both located in and inclined substantially to the light path, one set vertically and the other inclined substantially from the vertical.

21. In a camera the combination of two transparent plane reflectors both located in and inclined substantially 45° to the light path, one set vertically and the other inclined substantially 45° from the vertical.

22. A three-plate trichromatic-process negative-making camera containing two transparent reflectors, one standing vertically and inclined to the light path, the other inclined to both the vertical and the light path, and having its horizontal elements transverse to the light path.

23. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film.

24. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, the foremost reflector being parti-silvered in patterns or stripes.

25. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, the foremost reflector consisting of a colored glass having a parti-silvered first reflecting surface.

26. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, the foremost reflector consisting of a colored glass having a parti-silvered first reflecting surface, and the other reflector at the rear consisting of a glass of different color from the foremost reflector.

27. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, one of said reflectors being parti-silvered and having means for moving it during exposure substantially in its own plane in a manner to shift the pattern.

28. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, one of said reflectors being parti-silvered in recurring patterns and having means for moving it during exposure substantially in its own plane and transversely to the pattern arrangement.

29. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, the foremost reflector consisting of a colored glass parti-silvered at its first reflecting surface, and having means for moving it during exposure substantially in its own plane in a manner to shift the pattern.

30. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, the foremost reflector consisting of a colored glass parti-silvered in recurring patterns or stripes at its first reflecting surface, and having means for moving it during exposure substantially in its own plane transversely to the pattern or stripe.

31. A camera including in combination, means for holding three sensitive films vertically at the rear and at a vertical side and horizontally at the top or bottom of the camera respectively, and two transparent reflectors, one having its horizontal elements transverse to the light path and being inclined from the vertical to reflect an image to the third mentioned film, the other reflector standing vertical and inclined to the light path to reflect an image to the second film, the unreflected light passing to the first film, the foremost reflector consisting of a colored glass parti-silvered at its first reflecting surface, and having means for moving it during exposure substantially in its own plane in a manner to shift the pattern, the rearmost reflector consisting of glass of another color from the foremost.

32. A camera including in combination, means for holding three sensitive films vertically at the rear and at a vertical side and horizontally at the top or bottom of the camera respectively, and two transparent reflectors, one having its horizonal elements transverse to the light path and being inclined from the vertical to reflect an image to the third mentioned film, the other reflector standing vertical and inclined to the light path to reflect an image to the second film, the unreflected light passing to the first film, the foremost reflector consisting of a colored glass parti-silvered in recurring patterns or stripes at its first reflecting surface, and having means for moving it during exposure substantially in its own plane transversely to the pattern or stripe, the rearmost reflector consisting of glass of another color from the foremost.

In testimony whereof I affix my signature in presence of two witnesses.

FREDERIC E. IVES

Witnesses:
WM. J. DOLAN,
ELIZABETH B. KING.